United States Patent
Davis

(10) Patent No.: US 8,045,695 B2
(45) Date of Patent: Oct. 25, 2011

(54) SYSTEM FOR DETERMINING ACTIVE COPRESENCE OF USERS DURING INTERACTIONS

(75) Inventor: Marc Davis, San Franciso, CA (US)

(73) Assignee: Yahoo! Inc, Sunnyvale, CA (US)

( * ) Notice: Subject to any disclaimer, the term of this patent is extended or adjusted under 35 U.S.C. 154(b) by 615 days.

(21) Appl. No.: 12/239,979

(22) Filed: Sep. 29, 2008

(65) Prior Publication Data

US 2010/0080364 A1 Apr. 1, 2010

(51) Int. Cl.
*H04M 5/00* (2006.01)
*G06F 3/00* (2006.01)

(52) U.S. Cl. .......... 379/265.06; 710/17; 710/18; 710/19

(58) Field of Classification Search ............ 379/265.06; 715/716, 730, 738, 765; 710/60, 49, 220, 710/17, 18, 19
See application file for complete search history.

(56) References Cited

U.S. PATENT DOCUMENTS

| | | | |
|---|---|---|---|
| 7,124,164 B1 * | 10/2006 | Chemtob | 709/204 |
| 7,441,194 B2 * | 10/2008 | Vronay et al. | 715/738 |
| 7,478,129 B1 * | 1/2009 | Chemtob | 709/204 |
| 2003/0182420 A1 * | 9/2003 | Jones et al. | 709/224 |
| 2007/0143472 A1 * | 6/2007 | Clark et al. | 709/224 |
| 2009/0049394 A1 * | 2/2009 | Ricketts | 715/765 |
| 2009/0209274 A1 * | 8/2009 | Sangberg et al. | 455/462 |
| 2010/0030578 A1 * | 2/2010 | Siddique et al. | 705/3 |
| 2010/0299180 A1 * | 11/2010 | Tsatalos et al. | 705/9 |

OTHER PUBLICATIONS

"Social Presence"—Wikipedia entry, http://en.wikipedia.org/wiki/Social_presence; 1 p., Sep. 9, 2008.

* cited by examiner

*Primary Examiner* — Davetta W Goins
*Assistant Examiner* — Mohammad Islam
(74) *Attorney, Agent, or Firm* — Brinks Hofer Gilson & Lione

(57) ABSTRACT

A system is described for determining the active copresence of users during interactions. The system may include a processor, a memory, and an interface. The memory may store a degree of active copresence. The interface may communicate with a user. The processor may identify a primary interaction of the user. The processor may determine whether the user engages in a secondary interaction while the user is engaged in the primary interaction. The processor may determine the degree of active copresence of the user during the primary interaction based on a quality score of the primary interaction and a quality score of the secondary interaction. The degree of active copresence may represent the level of engagement of the user during the primary interaction. The processor may provide the degree of active copresence to the user via the interface.

31 Claims, 10 Drawing Sheets

| | | |
|---|---|---|
| 910 — | Copresent A | |
| | Business: (111) 111-1... | — 912 |
| | Mobile: (222) 222-2... | — 914 |
| | Copresence 92.3 | — 916 |
| | Acceptance 62.1 | — 918 |
| 920 — | Copresent B | |
| | Business: (333) 333-3... | — 922 |
| | Mobile: (444) 444-4... | — 924 |
| | Copresence 72.3 | — 926 |
| | Acceptance 12.1 | — 928 |
| 930 — | Copresent N | |
| | Business: (555) 555-5... | — 932 |
| | Mobile: (777) 777-7... | — 934 |
| | Copresence 95.3 | — 936 |
| 900 — | Acceptance 92.1 | — 938 |

FIG. 9

SYSTEM FOR DETERMINING ACTIVE COPRESENCE OF USERS DURING INTERACTIONS

TECHNICAL FIELD

The present description relates generally to a system and method, generally referred to as a system, for determining the active copresence of users during interactions, and more particularly, but not exclusively, to using the active copresence in social and communication applications.

BACKGROUND

The advancement of mobile devices, such as mobile phones, has allowed users to be accessible to non-present individuals from virtually anywhere at anytime. For example, a user of a mobile phone may be accessible to non-present individuals via emails, phone calls, text messages, instant messages, twitters, or generally any form of network communication. The pervasiveness of mobile communications with non-present individuals may be interfering with a user's interactions with present individuals.

SUMMARY

A system is disclosed for determining the active copresence of users during interactions. The system may include a memory, an interface and a processor. The memory may be used to store a degree of active copresence. The interface may be operatively connected to the memory and may communicate with a user. The processor may be operatively connected to the memory and the interface. The processor may identify a primary interaction of the user. The processor may determine whether the user engages in a secondary interaction while the user is engaged in the primary interaction. The processor may determine the degree of active copresence of the user during the primary interaction based on a quality score of the primary interaction and a quality score of the secondary interaction. The degree of active copresence may represent the level of engagement of the user during the primary interaction. The processor may provide the degree of active copresence to the user via the interface.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 9 is an illustration of an address book application implementing the system of FIG. 1, or other systems for determining the active copresence of users during interactions.

DETAILED DESCRIPTION

Figure 1:
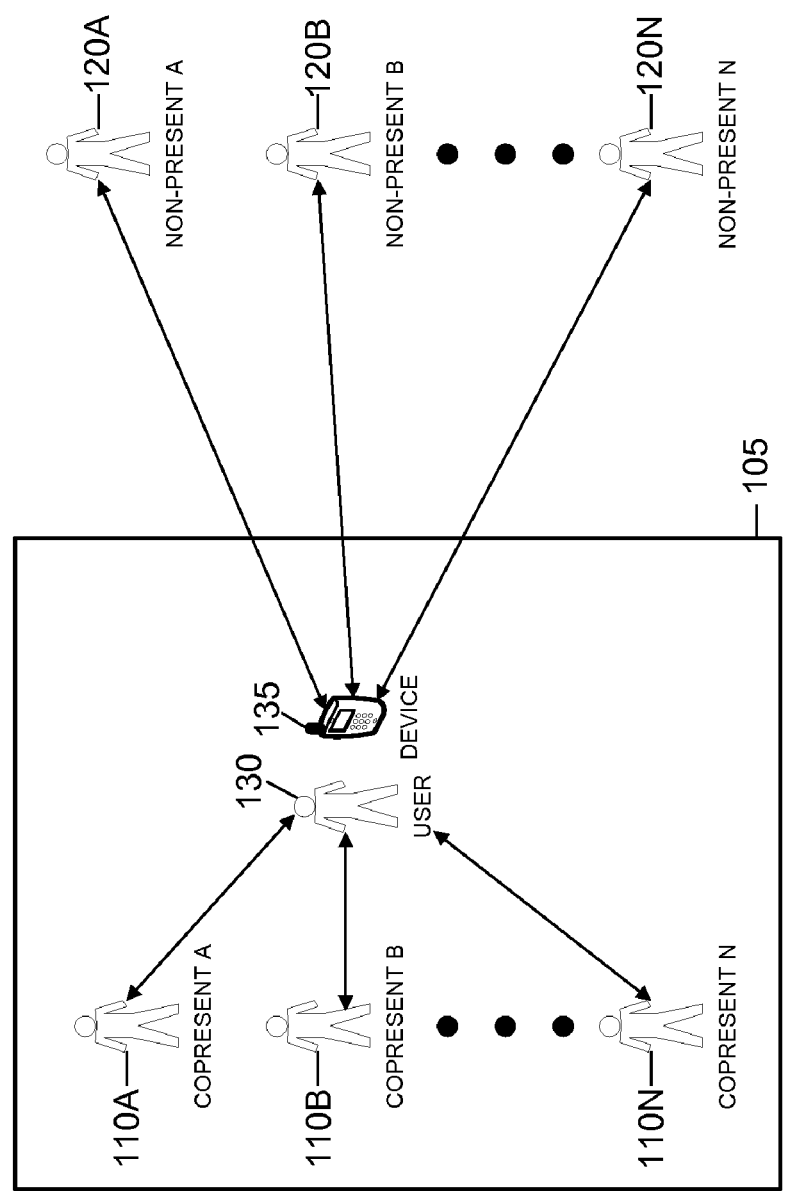
FIG. 1 is a block diagram of a general overview of a system for determining the active copresence of users during interactions.

A system and method, generally referred to as a system, relate to determining the active copresence of users during interactions, and more particularly, but not exclusively, to providing degrees of active copresence to social and communication applications. The degree of active copresence may represent a level of engagement of a user during an interaction. For example, a user may be interacting with one or more individuals, such as in a meeting. The user's degree of active copresence during the meeting may represent the degree to which the user was actively engaged in the meeting, as opposed to being passively engaged in the meeting. The user may be considered to be passively engaged in the meeting when the user is engaging in communications with non-present individuals, such as emails, voice mails, text messages, or generally any communications with non-present individuals. Thus, a user's degree of active copresence during an interaction may represent the level of which the user was actively engaged with copresent individuals during the interaction.

The system may provide a user with their degree of active copresence during an interaction with one or more copresent individuals. The interaction may be a meeting, a conference call, or generally any primary interaction requiring the active copresence of the user. The degree of active copresence may be based on the number of secondary interactions the user may have with non-present individuals during the interaction. Providing a user with their degree of active copresence may allow the user to prioritize future interactions. For example, if a user has a low degree of active copresence for a particular interaction, the user may wish to avoid similar interactions in the future. Conversely, if a user has a high degree of active copresence during a particular interaction the user may wish to prevent interruptions during similar interactions in the future.

The system may provide a user with their degree of active copresence relative to a particular individual. The degree of active copresence relative to a particular individual may incorporate only the user's interactions with the particular individual. The user may use the degree of active copresence relative to the individual to prioritize future interactions with the individual. For example, if the user has demonstrated a low degree of active copresence relative to a particular individual, the user may wish to avoid future interactions with the individual. Alternatively or in addition, if the user has demonstrated a high degree of active copresence with an individual the user may wish to prevent interruptions during interactions with the individual. Alternatively or in addition the degree of active copresence relative to an individual may be used to rank the relative importance of the individuals to the user, such as in a social network.

The system may allow the user to automate interaction prioritization using the relative degrees of active copresence. For example, if the user's degree of active copresence relative to an individual is high, the system may automatically prevent the user from being interrupted during interactions with the individual, such as by routing all phone calls directly to voicemail. Conversely, if the user's degree of active copresence relative to an individual is low, the system may allow secondary interactions to interrupt the interaction with the individual, such as phone calls, emails, or text messages.

The system may provide an employer with a degree of copresence of an employee while at work. The system may determine how much time during the day the user spends on non-work related activities and may calculate a degree of work active copresence. The system may provide the degree of work active copresence to the user or to the employer of the user.

The system may provide a user with a degree of work/life balance. The degree of work/life balance may be based on the amount of time the user spends on work interactions while at home and the amount of time the user spends on home interactions while at work. Alternatively or in addition the system may provide an organization with the degree of work/life balance of their employees. The organization may use the degrees of work/life balance to manage the workloads of the employees.

FIG. 1 provides a general overview of a system 100 for determining the active copresence of users during interactions. Not all of the depicted components may be required, however, and some implementations may include additional components. Variations in the arrangement and type of the components may be made without departing from the spirit or scope of the claims as set forth herein. Additional, different or fewer components may be provided.

The system 100 may include a user 130, a device 135, one or more copresent individuals 110A-N, a primary interaction 105 and one or more non-present individuals 120A-N. The copresent individuals 110A-N may be engaged in the primary interaction 105 with the user 130. The user 130 may engage in secondary interactions with the non-present individuals 120A-N through the device 135. The device 135 may be any device capable of communicating with a non-present individual 120A-N, such as a phone, a computer, or generally any communication device.

The copresent individuals 110A-N may be engaged in the primary interaction 105 with the user 130, such as a meeting, a conference call, or generally any interaction requiring the active copresence of the copresent individuals 110A-N and the user 130. The copresent individuals 110A-N may be located in the same location as the user 130, or the copresent individuals 110A-N may be located remotely from the user 130, such as a conference call. Generally the copresent individuals 110A-N may be the individuals that the user 130 is primarily engaged with, such as through the primary interaction 105.

The user 130 may maintain an interaction database, such as an electronic calendar, which stores data describing future and past primary interactions 105 with copresent individuals 110A-N. The system 100 may use the data stored in the interaction database to determine the periods of time when the user 130 is engaged in primary interactions with copresent individuals 110A-N. The interaction database may be accessible from the device 135.

The user 130 may engage in secondary interactions with the non-present individuals 120A-N during the primary interaction 105 via the device 135. The secondary interactions may include phone calls, emails, instant messaging, text messaging, or generally any method of communicating to one of the non-present individuals 120A-N. The device 135 may store contact information for the non-present individuals 120A-N, such as phone numbers, email addresses, instant messaging addresses, or generally any information capable of identifying the non-present individuals 120A-N.

Alternatively or in addition, the device 135 may represent multiple devices of the user 130 which access an address book application through a shared login. For example, a service provider, such as YAHOO!, INC., may provide a service to the user 130 that stores the contacts and interactions of the user 130. The user 130 may log into the service through any network connected device, such as the device 135. The service provider may also store data describing the secondary interactions of the user 130 with non-present individuals 120A-N while the user 130 is engaged in a primary interaction 105 with the copresent individuals 110A-N.

In operation, the user 130 may be engaged in a primary interaction 105 with the copresent individuals 110A-N, such as a meeting. While engaged in the primary interaction 105 with the copresent individuals, the user 130 may engage in one or more secondary interactions with the non-present individuals 120A-N via the device 135. The secondary interactions may include phone calls, emails, text messages, or generally any method of communicating with the non-present individuals 120A-N. The secondary interactions may be initiated by the user 130, or the secondary interactions may be requested by the non-present individuals 120A-N.

The system 100 may store data describing the primary interaction 105 with the copresent individuals 110A-N, such as the date/time of the primary interaction 105, the length of the primary interaction 105, and the copresent individuals 110A-N engaged in the primary interaction 105. The system 100 may also store data describing secondary interactions with the non-present individuals 120A-N during the primary interaction 105, such as the date/time of the secondary interaction, the length of the secondary interaction, the type of secondary interaction, and whether the secondary interaction was initiated by the user 130 or requested by one of the non-present individuals 120A-N. The stored data describing the primary interaction 105 and any secondary interactions of the user 130 may be used to determine a degree of active copresence of the user 130 during the primary interaction 105. The degree of active copresence may indicate the degree to which the user 130 was actively partaking in the primary interaction 105 with the copresent individuals 110A-N. The user 130 is presumed to be not actively partaking in the primary interaction 105 when the user 130 is engaged in secondary interactions, such as via the device 135.

The system 100 may determine a degree of active copresence of the user 130 relative to an interaction, or relative to a particular copresent individual A 110A. The relative degree of active copresence may be provided to a social or communication application, such as a calendar application or an address book application. In the case of the calendar application, the system 100 may provide the degrees of active copresence for completed primary interactions and may provide estimated degrees of active copresence for scheduled primary interactions. The user 130 may use the degrees of active copresence displayed in the calendar application to prioritize future interactions. For example, if the user 130 has demonstrated a low degree of active copresence in particular interaction, the user 130 may wish to avoid similar interactions in the future. Alternatively or in addition if there is a conflict between two interactions on the calendar of the user 130, the system 100 may automatically cancel the interaction which has the lower estimated degree of active copresence for the user 130. The steps of determining the degree of active copresence relative to an interaction may be discussed in more detail in FIG. 3 below. The steps of determining the degree of active copresence relative to a copresent individual A 110A may be discussed in more detail in FIG. 4 below.

In the case of an address book application, the system 100 may provide degrees of active copresence relative to each individual in the address book of the user 130. The degrees of active copresence relative to each individual may be based on the previous primary interactions the user 130 has had with the individuals. The device 135 of the user 130 may display the degree of active copresence relative to an individual when the user 130 receives an interaction request from the individual, such as an incoming phone call. The user 130 may use the degree of active copresence to determine whether to accept the incoming request. Alternatively or in addition the system 100 may automatically use the degree of active copresence relative to the individual to determine whether to accept an incoming interaction request. For example, if the system 100 determines that the degree of active copresence relative to an individual is low, the system 100 may ignore the request, such as sending a phone call directly to voicemail. The steps of automatic interaction request acceptance may be discussed in more detail in FIG. 7 below.

In the case of a social or communications network, the degrees of active copresence may be used as indicators of the relative importance of a copresent individual versus a non-present individual. Thus, the degrees of copresence may be used to populate social relevance values in the social or communications network.

Figure 2:
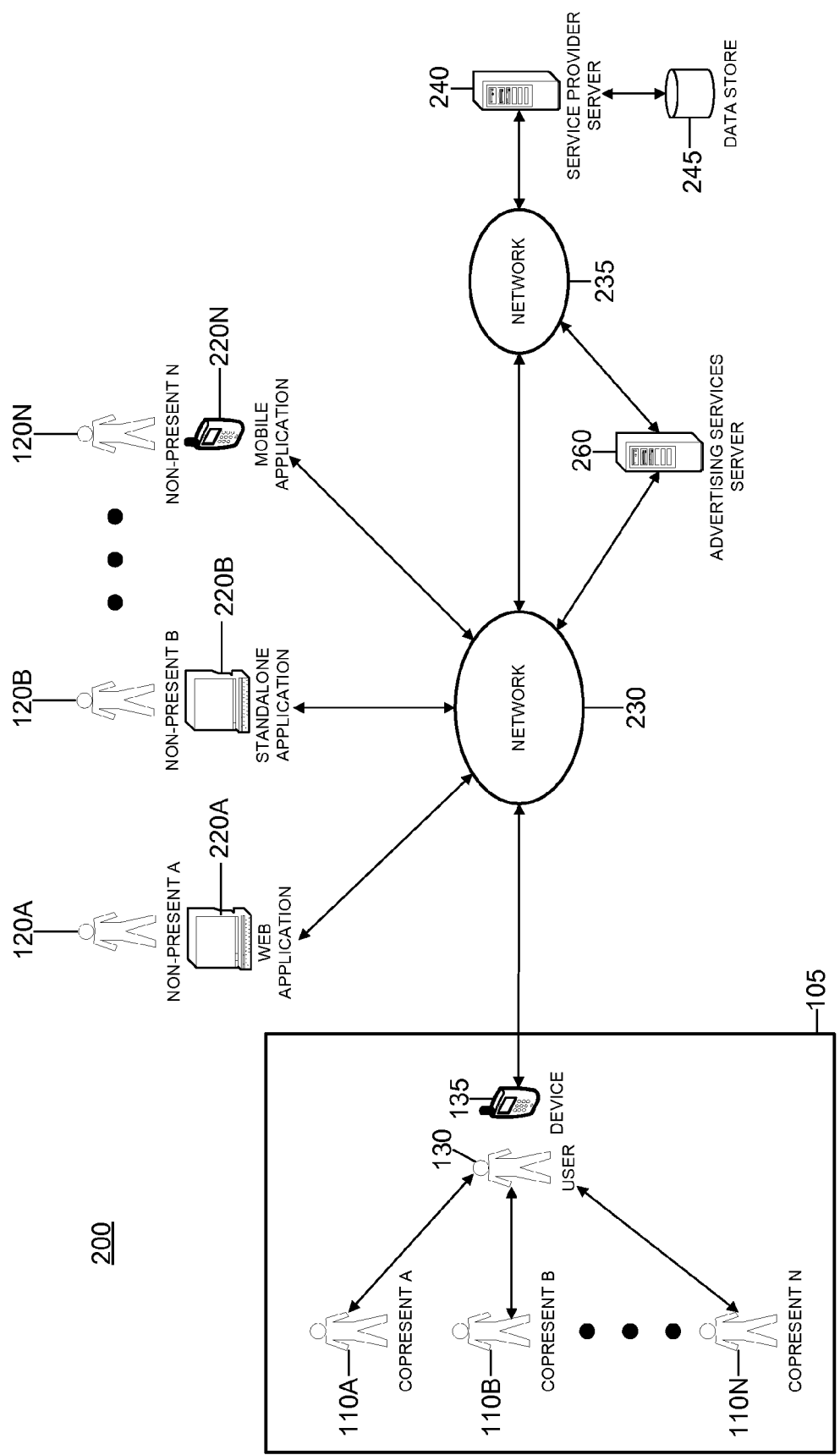
FIG. 2 is block diagram of a simplified view of a network environment implementing the system of FIG. 1 or other systems for determining the active copresence of users during interactions.

FIG. 2 provides a simplified view of a network environment implementing a system 200 for determining the active copresence of users during interactions. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The system 200 may include one or more web applications, standalone applications and mobile applications 220A-N, which may be collectively or individually referred to as client applications of the non-present individuals 120A-N. The mobile applications 220N may include mobile messaging applications, mobile browsers, or a telephony application.

The system 200 may also include one or more copresent individuals 110A-N, a user 130, a device 135, a network 230, a network 235, a service provider server 240, a data store 245, and an advertising services server 260. Some or all of the service provider server 240 and the advertisement services server 260 may be in communication with each other by way of network 235.

The networks 230, 235 may include wide area networks ("WAN"), such as the internet, mobile networks, local area networks ("LAN"), campus area networks, metropolitan area networks, phone networks, or any other networks that may allow for data or voice communication. The network 230 may include the Internet and may include all or part of network 235; network 235 may include all or part of network 230. The networks 230, 235 may be divided into sub-networks. The sub-networks may allow access to all of the other components connected to the networks 230, 235 in the system 200, or the sub-networks may restrict access between the components connected to the networks 230, 235. The network 235 may be regarded as a public or private network connection and may include, for example, a virtual private network or an encryption or other security mechanism employed over the public Internet, or the like.

The non-present individuals 120A-N may use a web application 220A, standalone application 220B, or a mobile application 220N, or any combination thereof, to engage in a secondary interaction with the user 130 via the device 135. The service provider server 240 may communicate with the device 135 via the networks 230, 235. The device 135 may include one or more of the web applications, standalone applications, or mobile applications, such as a standard telephone device. The web applications, standalone applications, and mobile applications 220AA-NN may be connected to the network 230 in any configuration that supports data or voice transfer. This may include a data or voice connection to the network 230 that may be wired or wireless. The web application 220A may run on any platform that supports web content, such as a web browser or a computer, a mobile phone, personal digital assistant ("PDA"), pager, network-enabled television, digital video recorder, such as TIVO®, automobile and/or any appliance capable of data communications.

The standalone applications 220B may run on a machine that may have a processor, memory, a display, a user interface and a communication interface. The processor may be operatively connected to the memory, display and the interfaces and may perform tasks at the request of the standalone application 220B or the underlying operating system. The memory may be capable of storing data. The display may be operatively connected to the memory and the processor and may be capable of displaying information to the non-present individual B 220B. The user interface may be operatively connected to the memory, the processor, and the display and may be capable of interacting with the non-present individual B 120B. The communication interface may be operatively connected to the memory, and the processor, and may be capable of communicating through the networks 230, 235 with the device 135. The standalone application 220B may be programmed in any programming language that supports communication protocols. These languages may include: SUN JAVA, C++, C#, ASP, SUN JAVASCRIPT, asynchronous SUN JAVASCRIPT, or ADOBE FLASH ACTIONSCRIPT, amongst others.

The mobile application 220N may run on any mobile device which may have a data or voice connection capable of engaging in an interaction with the user 130 via the device 135. The mobile applications 220N may be a mobile messaging application, a mobile browser, a microbrowser, or a telephony application. The mobile application 220N may be hosted on one of a broad range of electronic devices which may include mobile phones, PDAs, and laptops and notebook computers. Some of the electronic devices may have a reduced feature set, such as a smaller keyboard and/or screen, and may be incapable of supporting a traditional web search or may be incapable of accessing the Internet. A data connection of the electronic devices may be a cellular connection, such as a GSM/GPRS/WCDMA connection, a wireless data connection, an internet connection, an infra-red connection, a Bluetooth connection, or any other connection capable of transmitting data.

The service provider server 240 may include one or more of the following: an application server, a data source, such as a database server, a middleware server, and the advertising services server 260. The application server may be APACHE TOMCAT, MICROSOFT IIS, ADOBE COLDFUSION, YAPACHE or any other application server that supports communication protocols. The middleware server may be any middleware that connects software components or applications. The service provider server 240 may provide services to the user 130 via the device 135, such as a calendar application, an address book application, or generally any application which may be accessed by the user 130 on the device 135. The service provider server 240 may install the services on the device 135 and run processes locally on the device 135. The processes may track the primary and secondary interactions of the user 130 on the device 135 and may periodically provide data describing the interactions to the service provider server 240. The service provider server 240 may also determine and provide the degrees of active copresence to the user 130 via the device 135. The advertising services server 260 may provide a platform for the inclusion of advertisements in the services provided to the user 130, such as advertisements displayed in a calendar application or advertisements displayed in an address book application.

The service provider server 240 and the advertisement services server 260 may each represent multiple linked computing devices and may each be the system or components described in FIG. 8 below. Such computing devices may generally include any device that may be configured to perform computation and that may be capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol ("TCP/IP") protocol suite.

The data store 245 may store data describing the future and past interactions of the user 130 and may store the degrees of active copresence of the user 130. There may be several configurations of database servers included in the data store 245. The database servers may include MICROSOFT SQL SERVER, ORACLE, IBM DB2 or any other database software, relational or otherwise. The data store 245 may communicate directly with the service provider server 240 or may communicate to the service provider server 240 through the networks 230, 235.

The networks 230, 235 may be configured to couple one computing device to another computing device to enable communication of data between the devices. The networks 230, 235 may generally be enabled to employ any form of machine-readable media for communicating information from one device to another. Each of networks 230, 235 may include one or more of a wireless network, a wired network, a local area network ("LAN"), a wide area network ("WAN"), a direct connection such as through a Universal Serial Bus ("USB") port, and the like, and may include the set of interconnected networks that make up the Internet. The networks 230, 235 may include any communication method by which information may travel between computing devices.

Figure 3:
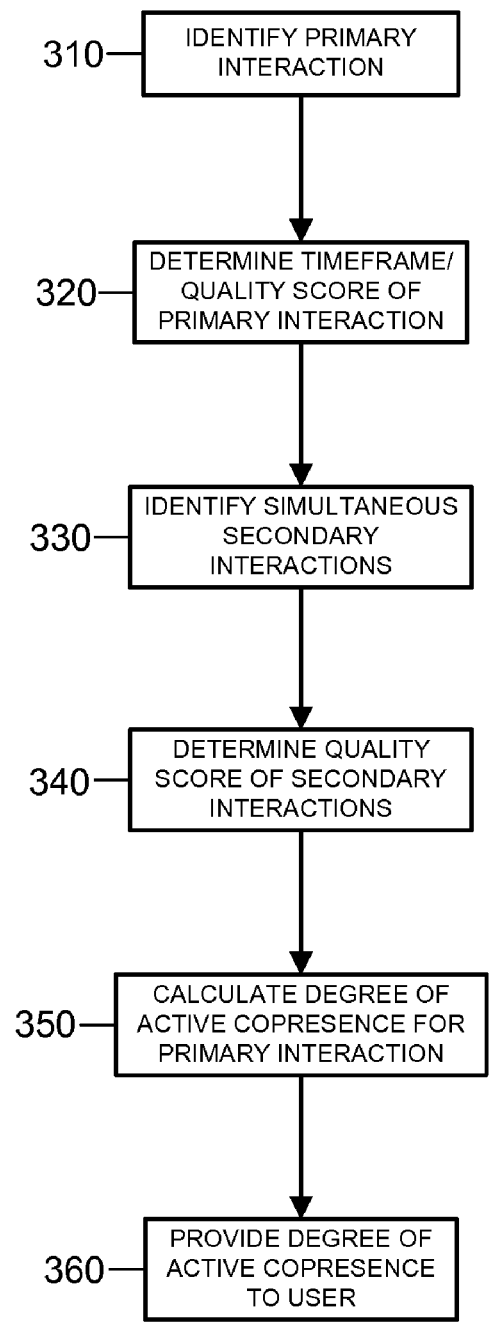
FIG. 3 is a flowchart illustrating operations of determining a user's degree of active copresence during an interaction in the system of FIG. 1, or other systems for determining the active copresence of users during interactions.

FIG. 3 is a flowchart illustrating operations of determining a user's degree of active copresence during an interaction in the system of FIG. 1, or other systems for determining the active copresence of users during interactions. At block 310 the system 100 may identify a primary interaction 105 of the user 130 with one or more copresent individuals 110A-N. The primary interaction 105 may be a conference call, a face-to-face meeting, or generally any interaction requiring the active copresence of the user 130. The primary interaction 105 may identified through a calendar application of the user 130. The calendar application may be provided to the device 135 of the user 130 by the service provider server 240. Alternatively or in addition the service provider server 240 may retrieve interaction data from a third party calendar application utilized by the user 130.

At block 320 the system 100 may determine the timeframe and the quality score of the primary interaction 105. The timeframe may include the date/time the primary interaction 105 was scheduled to start. The quality score may be based on one or more characteristics of the primary interaction 105, such as the length of the primary interaction 105, the subject matter of the primary interaction 105, the intimacy, or relationship, of the user 130 with the copresent individuals 110A-N, the business or nature of the primary interaction 130, the interaction history between the user 130 and the copresent individuals 110A-N, or generally any characteristic capable of describing the primary interaction 105. In one example the quality score may be the length of the primary interaction 105, or the amount of time scheduled for the primary interaction 105.

The length and timeframe may be retrieved by the service provider server 240 from the calendar application. Alternatively or in addition the user 130 may provide the length and timeframe of the primary interaction 105 to the service provider server 240. At block 330 the system 100 may identify secondary interactions with the non-present individuals 120A-N occurring during the timeframe scheduled for the primary interaction 105. The secondary interactions may include text messaging, instant messaging, emails, phone calls, or generally any mode of interacting with the non-present individuals 120A-N. In the case of an interaction 105 that already occurred, the system 100 may retrieve the communication logs of the device 135 of the user 120. Alternatively or in addition, the system 100 may monitor the communications of the user 120 throughout the interaction 105, such as through a process running on the device 135 of the user 130.

At block 340 the system 100 may determine the quality scores of the secondary interactions occurring during the primary interaction 105. The quality score of each secondary interaction may be based on one or more characteristics of the secondary interaction, such as the length of the secondary interaction, the subject matter of the secondary interaction, the intimacy, or relationship, of the user 130 with the non-present individual A 120A engaged in the secondary interaction, the business or nature of the secondary interaction, the interaction history between the user 130 and the non-present individual A 120A, or generally any characteristic capable of describing the secondary interaction. In one example the quality score may be the length of the secondary interactions. The length of a phone call or an instant message session may be determined based on the logs of the device 135. In the case of text messaging or emails, the system 100 may estimate the amount of time spent on an email or text message based on the length of the text message or email. For example, the system 100 may determine that the user 130 types three characters per second. Thus, if an email is thirty characters long, the system 100 may estimate the amount of time spent on the email as ten seconds. Alternatively or in addition the system 100 may monitor the activities of the user 130 on the device 135 in real-time, such as through a process running on the device 135 of the user 130. In this case the system 100 may monitor the amount of time the user 130 spends composing an email or text message on the device 135.

At block 350 the system 100 may calculate the degree of active copresence for the primary interaction 105. The degree of active copresence may be calculated by subtracting the length of the secondary interactions from the length of the primary interaction 105 and dividing the result by the length of the primary interaction 105. Alternatively or in addition the result may be multiplied by 100. At block 360 the system 100 may provide the degree of active copresence for the primary interaction 105 to the user 130, such as through a calendar application. The steps of providing the degree of active copresence via a calendar application may be discussed in more detail in FIG. 8 below.

Figure 4:
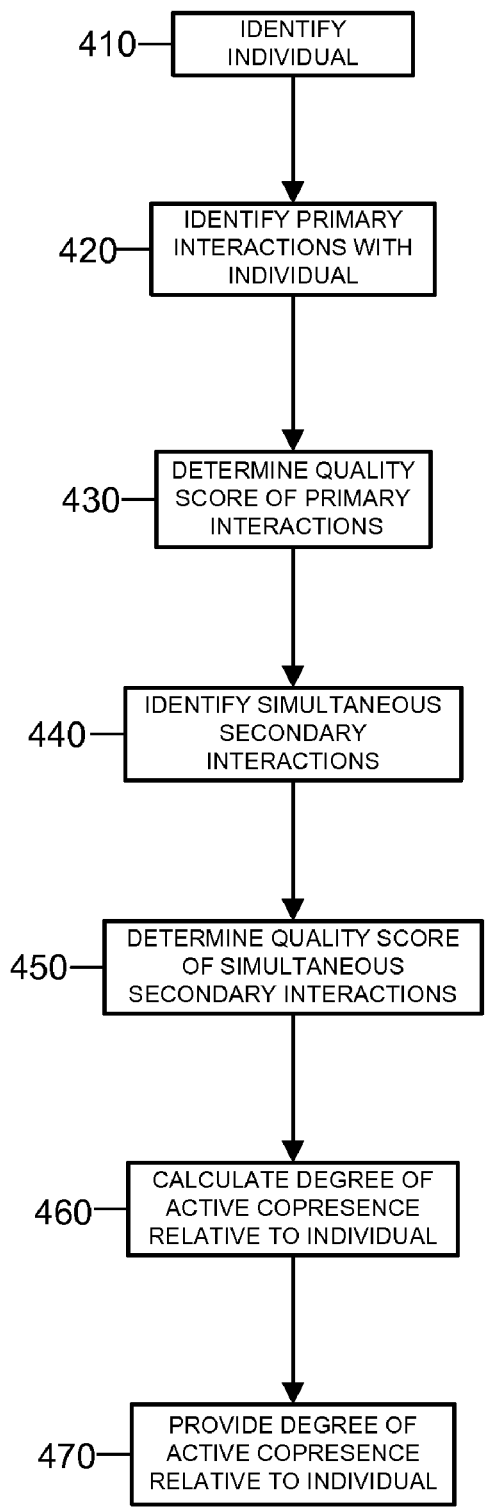
FIG. 4 is a flowchart illustrating operations of determining a user's degree of active copresence during interactions relative to an individual in the system of FIG. 1, or other systems for determining the active copresence of users during interactions.

FIG. 4 is a flowchart illustrating operations of determining a user's degree of active copresence during interactions relative to an individual in the system of FIG. 1, or other systems for determining the active copresence of users during interactions. At block 410 the system 100 may identify a copresent individual A 110A the user 130 engaged in primary interactions with, such as meetings or conference calls. The copresent individual A 110A may be identified in an address book application of the user 130. At block 420 the system 100 may identify the primary interactions the user 130 was engaged in with the copresent individual A 110A. The primary interactions of the user 130 with the copresent individual A 110A may be retrieved from a calendar application or scheduling application utilized by the user 130.

At block 430 the system 100 may determine the quality score of the primary interactions with the copresent individual A 110A. The quality score may be based on one or more characteristics of the primary interactions 105, such as the length of the primary interactions 105, the subject matter of the primary interactions 105, the intimacy, or relationship, of the user 130 with the copresent individuals 110A-N, the business or nature of the primary interactions 130, the interaction history between the user 130 and the copresent individuals 110A-N, or generally any characteristic capable of describing the primary interactions 105. In one example the quality score may be the total length of the plurality of primary interactions, or the total amount of time scheduled for the plurality of primary interactions 105.

At block 440 the system 100 may identify secondary interactions the user 130 engaged in while engaged in a primary interaction 105 with the copresent individual A 110A. At block 450 the system 100 may determine the total quality score of the secondary interactions. The total quality score of the secondary interactions may be based on one or more characteristics of each secondary interaction, such as the length of each secondary interaction, the subject matter of each secondary interaction, the intimacy, or relationship, of the user 130 with the non-present individual A 120A engaged in each secondary interaction, the business or nature of each secondary interaction, the interaction history between the user 130 and the non-present individual A 120A, or generally any characteristic capable of describing the secondary interaction. In one example each quality score may be the length of each secondary interaction and the total quality score may be the total length of the secondary interactions.

At block 460 the system 100 may determine the degree of active copresence of the user 130 relative to the copresent individual A 110A. The degree of active copresence relative to the copresent individual A 110A may be calculated by subtracting the total length of the simultaneous secondary interactions from the total length of the primary interactions, and dividing the result by the total length of the primary interactions. Alternatively or in addition the result may be multiplied by 100, such as to generate a whole number.

At block 470 the system 100 may provide the degree of active copresence relative to the copresent individual A 110A to the user 130. For example, the system 100 may provide the degree of active copresence to the user 130 via an address book application. The address book application may display the degree of active copresence relative to the copresent individual A 110A with the contact information of the copresent individual A 110A along with the degree of active copresence of the user 130 relative to the individual A 110A. An address book application providing the degree of active copresence relative to a copresent individual A 110A may be discussed in more detail in FIG. 9 below.

The degree of active copresence relative to the copresent individual A 110A may also be used to determine whether the user 130 should be interrupted by secondary interactions while engaged in a primary interaction 105 with the copresent individual A 110A. For example, if device 135 receives a request for a secondary interaction, such a phone call, while the user 130 is engaged in a primary interaction 105 with the copresent individual A 110A, the system 100 may determine whether the degree of active copresence relative to the copresent individual A 110A satisfies an interrupt threshold. If the degree of active copresent relative to the copresent individual A 110A does not satisfy the interrupt threshold the device 135 may automatically prevent the secondary interaction request from interrupting the primary interaction 105, such as by forwarding a phone call directly to voicemail. Thus, the interrupt threshold allows the user 130 to avoid interruptions while engaged in primary interactions with a copresent individual A 110A with a high relative degree of active copresence. The interrupt threshold may be discussed in more detail in FIG. 7 below.

Figure 5:
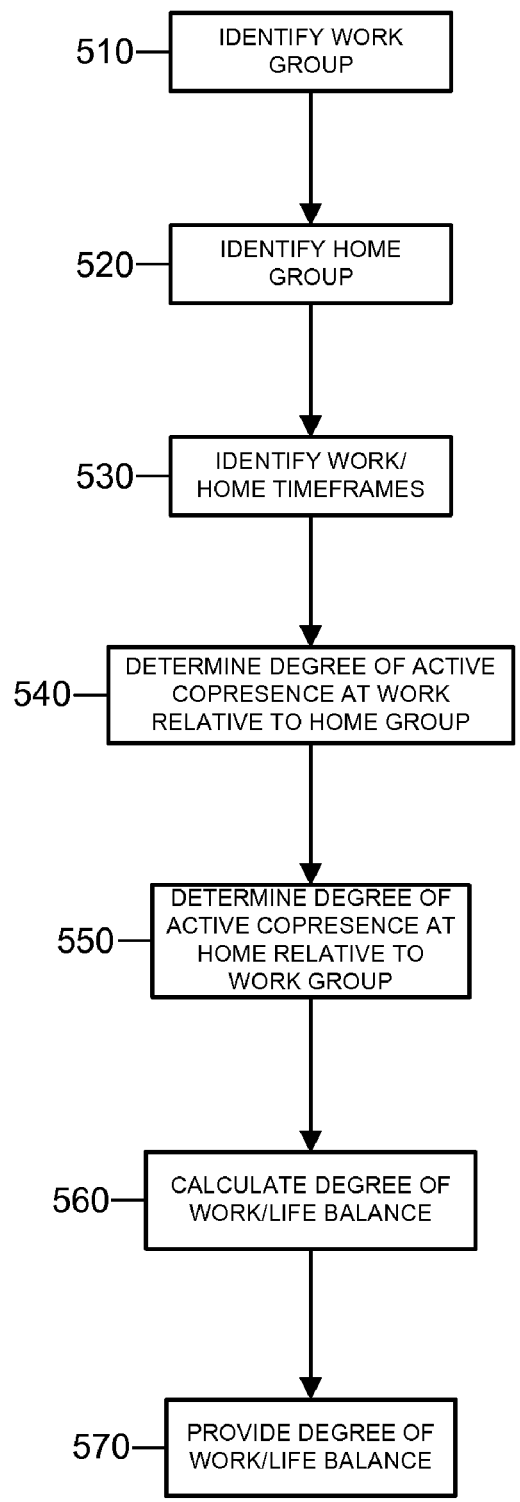
FIG. 5 is a flowchart illustrating operations of determining a user's degree of work/life balance in the system of FIG. 1, or other systems for determining the active copresence of users during interactions.

FIG. 5 is a flowchart illustrating operations of determining a user's degree of work/life balance in the system of FIG. 1, or other systems for determining the active copresence of users during interactions. At block 510 the system 100 may identify a group of individuals that are associated with the workplace of the user 130. For example, the system 100 may retrieve data from an address book application of the user 130 that identifies individuals as work contacts. Work contacts may include colleagues, co-workers, third party contractors, or generally any individuals associated with the workplace of the user 130. Alternatively or in addition the user 130 may provide information to the system 100 identifying the individuals who are associated with the workplace of the user 130.

At block 520 the system 100 may identify a group of individuals that are associated with the home of the user 130. For example, the system 100 may retrieve data from an address book application of the user 130 that identifies individuals as home contacts. Home contacts may include individuals who are friends, family, or generally any individuals who are not associated with the workplace of the user 130. Alternatively or in addition the user 130 may provide information to the system 100 identifying the individuals who are associated with the home of the user 130.

At block 530 the system 100 may identify the timeframe associated with the workplace of the user 130 and the timeframe associated with the home of the user 130. Generally the timeframe associated with the workplace of the user 130 would be business hours, such as nine in the morning until five in the afternoon on Monday through Friday. The remaining timeframe would be associated with the home of the user 130. The system 100 may retrieve the home and work timeframes from a calendar application of the user 130. Alternatively or in addition the user 130 may provide the home and work timeframes to the system 100.

At block 540 the system 100 may determine the degree of active copresence of the user 130 at work relative to the home group. In order to determine the degree of active copresence at work relative to the home group the system 100 may determine the total length of the work timeframe. The system 100 may then determine the amount of time the user 130 was engaged in secondary interactions with non-present individuals 120A-N in the home group during the work timeframe. The system 100 may then subtract the total time spent on the secondary interactions from the total length of the work timeframe and divide the result by the total length of the work timeframe. Alternatively or in addition the system 100 may multiply the result by 100, such as to generate a whole number.

At block 550 the system 100 may determine the degree of active copresence of the user 130 at home relative to the work group. In order to determine the degree of active copresence at home relative to the work group the system 100 may determine the total length of the home timeframe. The system 100 may then determine the amount of time the user 130 was engaged in secondary interactions with non-present individuals 120A-N in the work group during the home timeframe. The system 100 may then subtract the total time spent on the secondary interactions from the total length of the home timeframe, and divide the result by the total length of the home timeframe. Alternatively or in addition the system 100 may multiply the result by 100, such as to generate a whole number.

At block 560 the system 100 may calculate the degree of work/life balance of the user 130. The degree of work/life balance may be calculated by dividing the degree of active copresence at work relative to the home group by the degree of active copresence at home relative to the work group. Alternatively or in addition the degree of work/life balance may be calculated by dividing the degree of active copresence at home relative to the work group by the degree of active copresence at work relative to the home group. Alternatively or in addition the result may be multiplied by 100, such as to generate a whole number.

At block 570 the system 100 may provide the degree of work/life balance to the user 130. The degree of work/life balance may be presented to the user 130 as a number or may be presented to the user 130 through a chart or graphic. For example, if the degree of work/life balance is calculated by dividing the degree of active copresence at work relative to the home group by the degree of active copresence at home relative to the work group, a degree of work/life balance greater than one may indicate that the work life balance favors work, while a degree of work/life balance less than one may indicate that the work/life balance favors home.

Figure 6:
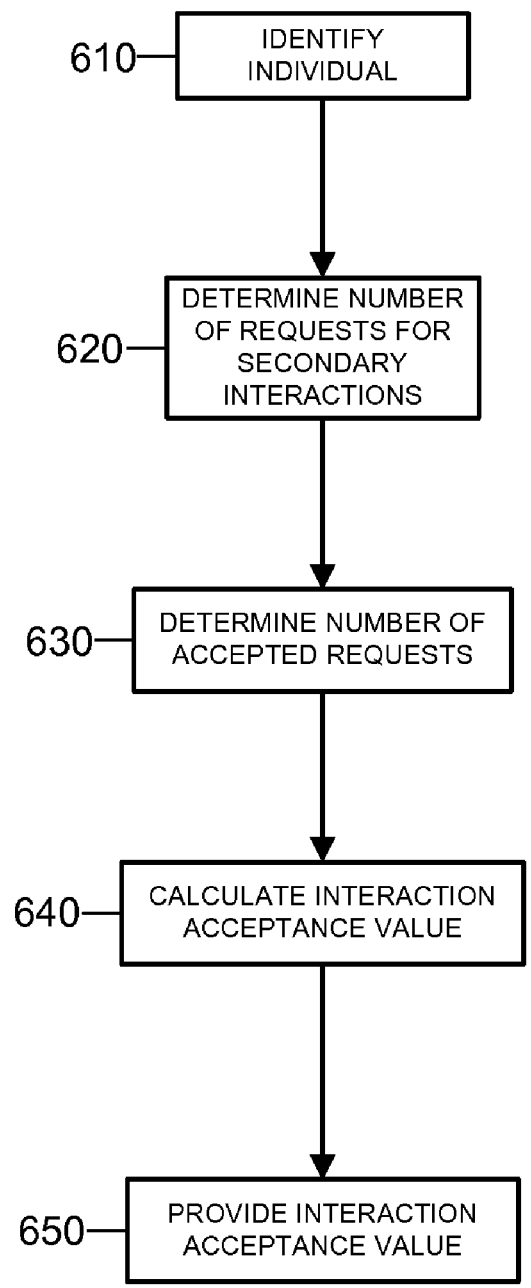
FIG. 6 is a flowchart illustrating operations of determining an interaction acceptance value for an individual in the system of FIG. 1, or other systems for determining the active copresence of users during interactions.

FIG. 6 is a flowchart illustrating operations of determining an interaction acceptance value for an individual in the system of FIG. 1, or other systems for determining the active copresence of users during interactions. At block 610 the system 100 may identify an individual the user 130 receives secondary interaction requests from, such as phone calls, text messages, instant messages, or generally any mode of initiating communications with the user 130. The individual may be identified in an address book application of the user 130. At block 620 the system 100 may determine the number of secondary interaction requests the user 130 received from the identified individual while engaged in a primary interaction. At block 630 the system 100 may determine the number of the secondary interaction requests which were accepted by the user 130. An interaction request may be deemed accepted if the user 130 engages in a secondary interaction with the individual in response to the interaction request. For example, in the case of a phone call, the request may be deemed accepted if the user 130 answers the phone call. In the case of a text message, email, or instant message, the request may be deemed accepted if the user 130 responds to the text message, email or instant message during the primary interaction.

At block 640 the system 100 may calculate an interaction acceptance value for the individual. The interaction acceptance value may be calculated by dividing the number of secondary interaction requests received from the identified individual by the number of requests that were accepted by the user 130. Alternatively or in addition the result may be multiplied by 100. At block 650 the system 100 may provide the interaction acceptance value to the user 130. The interaction acceptance value may be provided to the user 130 via an address book application. For example, the interaction acceptance value may be displayed with the contact information for the individual. Alternatively or in addition the interaction acceptance value may be displayed to the user 130 with incoming secondary interaction requests from the individual. Alternatively or in addition the interaction acceptance value may be used to determine whether to automatically block incoming secondary interaction requests from the individual during primary interactions, such as by sending phone calls directly to voicemail.

Figure 7:
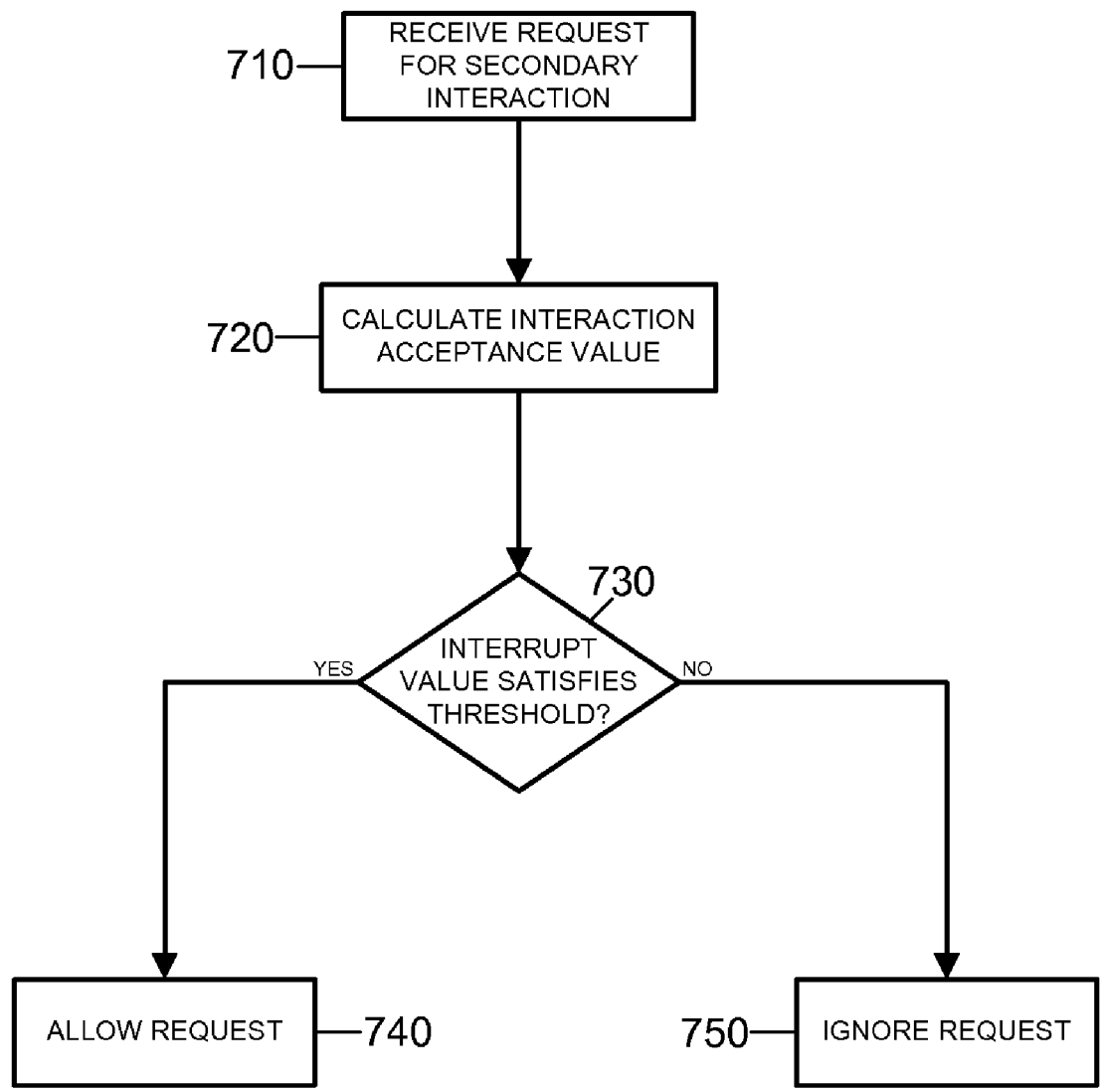
FIG. 7 is a flowchart illustrating operations of interaction request handling in the system of FIG. 1, or other systems for determining the active copresence of users during interactions.

FIG. 7 is a flowchart illustrating operations of interaction request handling in the system of FIG. 1, or other systems for determining the active copresence of users during interactions. At block 710 the system 100 may receive a request for a secondary interaction during a primary interaction, such as an incoming phone call, email, text message, instant message, or generally any mode of initiating communications with the user 130. At block 720 the system 100 may calculate the interaction acceptance value for the individual initiating the secondary interaction request. Calculating the interaction acceptance value for an individual may be described in more detail in FIG. 6 above.

At block 730 the system 100 may determine whether the interaction acceptance value for the individual requesting the secondary interaction meets an interaction interrupt threshold. The interaction interrupt threshold may represent a criteria for determining whether the user 130 should be interrupted during a primary interaction. For example, the user 130 may set the interrupt threshold to a high number, such as 90, if the user 130 does not want to frequently be interrupted during primary interactions. In this case, the interaction interrupt threshold would only be satisfied by an individual with an interaction acceptance value greater than 90, which would presumably be individuals whose communications are most important to the user 130. Alternatively if the user 130 doesn't mind being interrupted during a primary interaction, the user 130 may set the interaction interrupt threshold to a lower number, such as 50. In this case any individuals with an interaction acceptance value greater than 50 will satisfy the interaction interrupt threshold.

Alternatively or in addition the system 100 may calculate the degree of active copresence for the primary interaction the user 130 is engaged in. The interaction interrupt threshold may also incorporate a degree of active copresence component in order to account for the importance of the primary interaction. For example, the interaction interrupt threshold may only be met if the degree of active copresence of the primary interaction is below a certain number, such as 80. In this case the user 130 will only be interrupted with secondary interactions if the degree of active copresence is less than 80. The incorporation of the degree of active copresence of the primary interaction allows the user 130 to specify when primary interactions should not be interrupted, such as by setting the degree of active copresence component of the interrupt threshold to 100.

If, at block 730, the interaction interrupt threshold is satisfied, the system 100 may move to block 740. At block 740 the system 100 may allow the secondary interaction request and notify the user 130 of the secondary interaction request. For example, if the secondary interaction request is a phone call, the system 100 may allow the device 135 of the user 130 to receive the call. If the request is a text message, email or instant message, the system 100 may provide the message to the device 135 of the user 130. The system 100 may run processes on the device 135 of the user 130 which control whether the device 135 receives a phone call.

If, at block 730, the interaction interrupt threshold is not satisfied, the system 100 may move to block 750. At block 750 the system 100 may ignore the request, and withhold notification of the request from the user 130. For example, in the case of a phone call, the system 100 may cause the call to route directly to the voicemail of the user 130. Alternatively or in addition the system 100 may allow the call to proceed to the device 135 of the user 130, but may prevent the device 135 from notifying the user 130. For example, the system 100 may cause the device 135 of the user 130 to enter a silent mode for the incoming call. In the case of a text message, instant message or email message, the system 100 may withhold the message from being forwarded to the user 130 until the primary interaction 105 has completed. Alternatively or in addition the system 100 may allow the message to be communicated to the user 130, but the system 100 may prevent the device 135 from notifying the user 130. For example, the system 100 may cause the device 135 to enter a silent mode before receiving the message. The system 100 may be able to control the device 135 through an application installed on the device 135.

Figure 8:
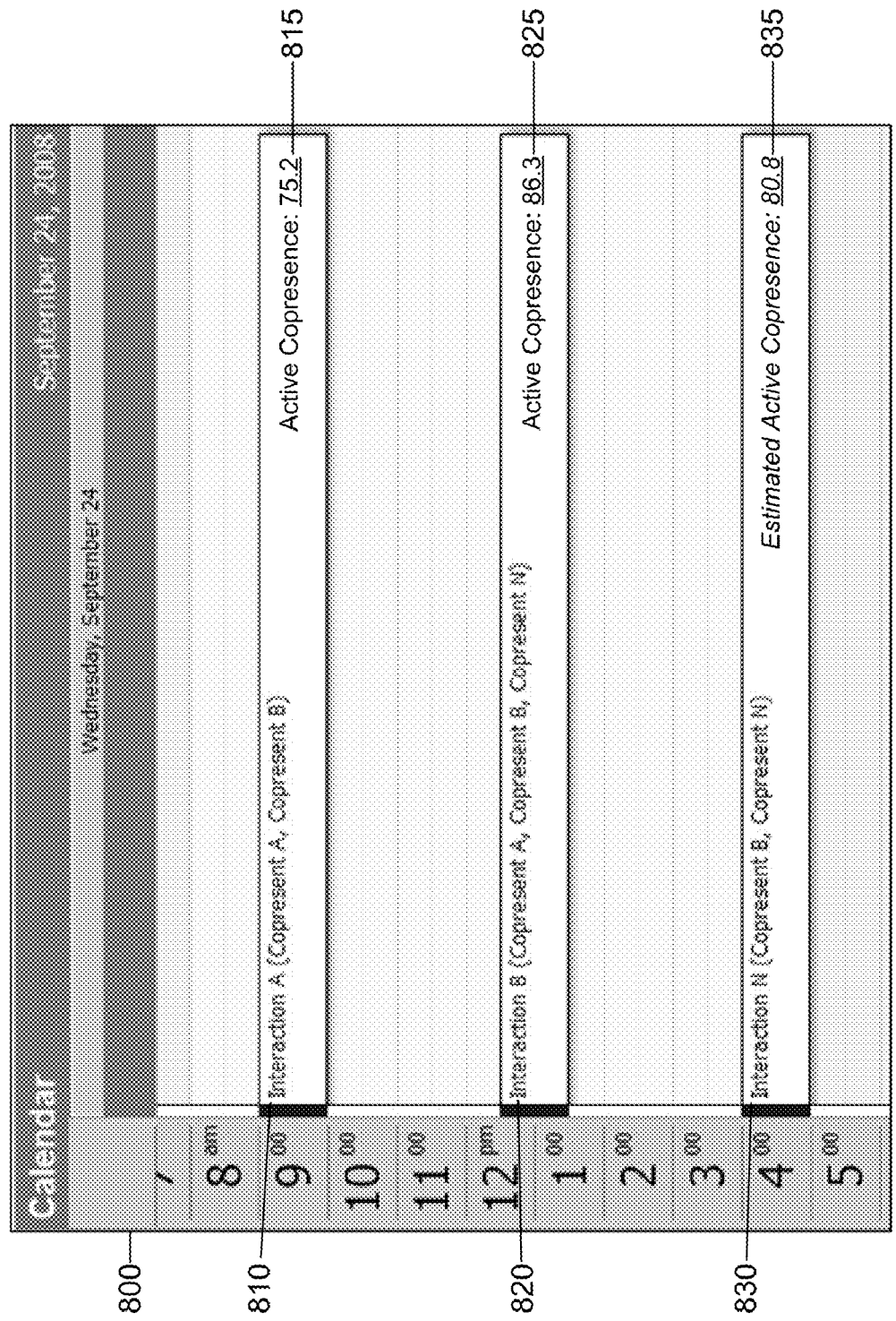
FIG. 8 is an illustration of a calendar application implementing the system of FIG. 1, or other systems for determining the active copresence of users during interactions.

FIG. 8 illustrates a calendar application 800, implementing the system of FIG. 1, or other systems for determining the active copresence of users during interactions. The calendar application includes an interaction A 810, an interaction B 820, and an interaction N 830. The interaction A 810 may have a degree of active copresence 815 of 75.2, the interaction B 820 may have a degree of active copresence 825 of 86.3, and the interaction N 830 may have an estimated degree of active copresence 835 of 80.8.

The interaction A 810 and the interaction B 820 may represent primary interactions 105 that have already occurred. The degrees of active copresence 815, 825 may reflect the degree of active copresence of the user 130 during the primary interactions 810, 820. The steps of calculating the degree of active copresence of the user 130 during a primary interaction may be discussed in more detail in FIG. 3 above.

The interaction N 830 may be an interaction that has not yet occurred. Thus, the estimated degree of active copresence 835 may be calculated by determining the degree of active copresence of the user 130 during previous interactions with the copresent individual B 110B and the copresent individual N 110N. The steps of calculating the degree of active copresence of the user 130 relative to the individual B 110B and the individual N 110N may be discussed in more detail in FIG. 4 above.

The user 130 may use estimated degrees of active copresence, such as the estimated degree of active copresence 835, to evaluate conflicting appointments. For example, if the user 130 has two conflicting appointments scheduled, the user 130 may choose to attend the appointment with the higher estimated degree of active copresence. Alternatively or in addition, if the user 130 schedules two conflicting appointments the system 100 may automatically cancel the appointment with the lower estimated degree of active copresence 835 and notify the user 130 of the cancellation.

FIG. 9 illustrates an address book application 900, implementing the system of FIG. 1, or other systems for determining the active copresence of users during interactions. The address book application 900 may include an entry 910 for the copresent individual A 110A, an entry 920 for the copresent individual B 110B, and an entry 930 for the copresent individual N 110N. The entry 910 may include a business phone number 912, a mobile phone number 914, a degree of active copresence 916 and an interaction acceptance value 918. The entry 920 may include a business phone number 922, a mobile phone number 924, a degree of active copresence 926 and an interaction acceptance value 928. The entry 930 may include a business phone number 932, a mobile phone number 934, a degree of active copresence 936 and an interaction acceptance value 938.

The degrees of active copresence 916, 926, 936 may represent the degree of active copresence the user 130 has demonstrated in previous primary interactions with the copresent individuals 110A-N. The steps of calculating the degree of active copresence relative to each of the copresent individuals 110A-N may be discussed in more detail in FIG. 4 above. The interaction acceptance values 918, 928, 938 may represent the percentage of secondary interaction requests accepted by the user 130 from the copresent individuals 110A-N during a primary interaction. The steps of calculating the interaction acceptance values 918, 928, 938 may be discussed in more detail in FIG. 6 above.

The user 130 may group the copresent individuals 110A-N by the degrees of active copresence 916, 926, 936 and/or the interaction acceptance values 918, 928, 938. For example, the user 130 may group copresent individuals 110A-N with high degrees of active copresence as important individuals and copresent individuals 110A-N with low degrees of active copresence as unimportant individuals. The interaction acceptance values 918, 928, 938 and the degrees of active copresence 916, 926, 936 may assist the user 130 with determining an order to respond to multiple simultaneous secondary interaction requests. For example, if the user 130 receives multiple secondary interaction requests, such as text messages, from each of the copresent individuals 110A-N, the system 100 may order the text messages based on the interaction acceptance values 918, 928, 938 of the copresent individuals 110A-N. Thus, the system 100 may allow the user 130 to respond to the most important copresent individuals 110A-N first.

Figure 10:
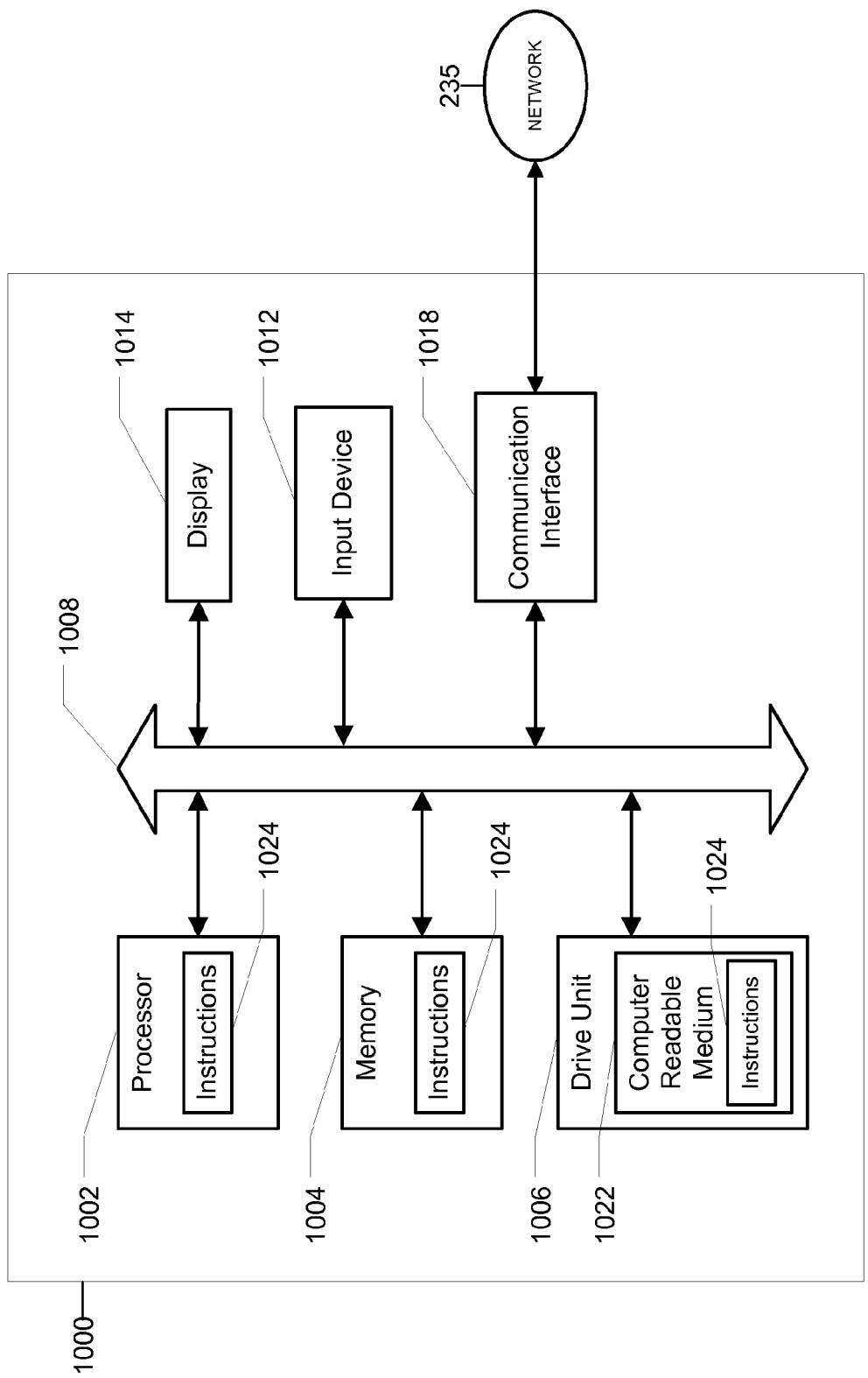
FIG. 10 is an illustration a general computer system that may be used in a system for determining the active copresence of users during interactions.

FIG. 10 illustrates a general computer system 1000, which may represent a device 135, or any of the other computing devices referenced herein. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The computer system 1000 may include a set of instructions 1024 that may be executed to cause the computer system 1000 to perform any one or more of the methods or computer based functions disclosed herein. The computer system 1000 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1000 may also be implemented as or incorporated into various devices, such as a personal computer ("PC"), a tablet PC, a set-top box ("STB"), a personal digital assistant ("PDA"), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 1024 (sequential or otherwise) that specify actions to be taken by that machine. In a particular embodiment, the computer system 1000 may be implemented using electronic devices that provide voice, video or data communication. Further, while a single computer system 1000 may be illustrated, the term "system" shall also be taken to include any collection of systems or sub-systems that individually or jointly execute a set, or multiple sets, of instructions to perform one or more computer functions.

As illustrated in FIG. 10, the computer system 1000 may include a processor 1002, such as, a central processing unit ("CPU"), a graphics processing unit ("GPU"), or both. The processor 1002 may be a component in a variety of systems. For example, the processor 1002 may be part of a standard personal computer or a workstation. The processor 1002 may be one or more general processors, digital signal processors, application specific integrated circuits, field programmable gate arrays, servers, networks, digital circuits, analog circuits, combinations thereof, or other now known or later developed devices for analyzing and processing data. The processor 1002 may implement a software program, such as code generated manually (i.e., programmed).

The computer system 1000 may include a memory 1004 that can communicate via a bus 1008. The memory 1004 may be a main memory, a static memory, or a dynamic memory. The memory 1004 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 1004 may include a cache or random access memory for the processor 1002. Alternatively or in addition, the memory 1004 may be separate from the processor 1002, such as a cache memory of a processor, the system memory, or other memory. The memory 1004 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 1004 may be operable to store instructions 1024 executable by the processor 1002. The functions, acts or tasks illustrated in the figures or described herein may be performed by the programmed processor 1002 executing the instructions 1024 stored in the memory 1004. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 1000 may further include a display 1014, such as a liquid crystal display ("LCD"), an organic light emitting diode ("OLED"), a flat panel display, a solid state display, a cathode ray tube ("CRT"), a projector, a printer or other now known or later developed display device for outputting determined information. The display 1014 may act as an interface for the user to see the functioning of the processor 1002, or specifically as an interface with the software stored in the memory 1004 or in the drive unit 1006.

Additionally, the computer system 1000 may include an input device 1012 configured to allow a user to interact with any of the components of system 1000. The input device 1012 may be a number pad, a keyboard, or a cursor control device, such as a mouse, or a joystick, touch screen display, remote control or any other device operative to interact with the system 1000.

The computer system 1000 may also include a disk or optical drive unit 1006. The disk drive unit 1006 may include a computer-readable medium 1022 in which one or more sets of instructions 1024, e.g. software, can be embedded. Further, the instructions 1024 may perform one or more of the methods or logic as described herein. The instructions 1024 may reside completely, or at least partially, within the memory 1004 and/or within the processor 1002 during execution by the computer system 1000. The memory 1004 and the processor 1002 also may include computer-readable media as discussed above.

The present disclosure contemplates a computer-readable medium 1022 that includes instructions 1024 or receives and executes instructions 1024 responsive to a propagated signal; so that a device connected to a network 230 may communicate voice, video, audio, images or any other data over the network 230. The instructions 1024 may be implemented with hardware, software and/or firmware, or any combination thereof. Further, the instructions 1024 may be transmitted or received over the network 230 via a communication interface 1018. The communication interface 1018 may be a part of the processor 1002 or may be a separate component. The communication interface 1018 may be created in software or may be a physical connection in hardware. The communication interface 1018 may be configured to connect with a network 230, external media, the display 1014, or any other components in system 1000, or combinations thereof. The connection with the network 230 may be a physical connection, such as a wired Ethernet connection or may be established wirelessly as discussed below. Likewise, the additional connections with other components of the system 1000 may be physical connections or may be established wirelessly.

The network 230 may include wired networks, wireless networks, or combinations thereof. The wireless network may be a cellular telephone network, an 802.11, 802.16, 802.20, or WiMax network. Further, the network 230 may be a public network, such as the Internet, a private network, such as an intranet, or combinations thereof, and may utilize a variety of networking protocols now available or later developed including, but not limited to TCP/IP based networking protocols.

The computer-readable medium 1022 may be a single medium, or the computer-readable medium 1022 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 1022 may include a solid-state memory such as a memory card or other package that houses one or more non-volatile read-only memories. The computer-readable medium 1022 also may be a random access memory or other volatile re-writable memory. Additionally, the computer-readable medium 1022 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A computer implemented method for providing a degree of active copresence of a user during an interaction, comprising:
   identifying a primary interaction of the user;
   determining whether the user engages in a secondary interaction while engaged in the primary interaction;
   determining a degree of active copresence of the user during the primary interaction based on a quality score of the primary interaction and a quality score of the secondary interaction, wherein the degree of active copresence represents a level of engagement of the user during the primary interaction; and
   providing the degree of active copresence to the user.

2. The computer implemented method of claim 1 wherein the degree of active copresence is provided via a calendar interface.

3. The computer implemented method of claim 1 wherein the secondary interaction comprises of an electronic communication.

4. The computer implemented method of claim 1 wherein the secondary interaction comprises of a phone call.

5. The computer implemented method of claim 1 wherein the quality score of the primary interaction is based on a length of the primary interaction and the quality score of the secondary interaction is based on the length of the secondary interaction.

6. The computer implemented method of claim 5 wherein the degree of active copresence is based on a proportion of the length of the secondary interaction relative to the length of the primary interaction.

7. A computer implemented method for providing a degree of active copresence of a user during interactions with an individual, comprising:
- identifying a plurality of primary interactions of the user with the individual;
- identifying a plurality of secondary interactions of the user, the secondary interactions occurring while the user was engaged in one of the primary interactions with the individual;
- calculating a degree of active copresence of the user while interacting with the individual based on a quality score of the plurality of primary interactions and a quality score of the plurality of secondary interactions, wherein the degree of active copresence represents a level of engagement of the user while interacting with the individual; and
- providing the degree of active copresence to the user.

8. The computer implemented method of claim 7 wherein at least one of the secondary interactions comprises of an electronic communication.

9. The computer implemented method of claim 7 wherein at least one of the secondary interactions comprises of a phone call.

10. The computer implemented method of claim 7 wherein the degree of active copresence is provided to the user via an address book interface.

11. The computer implemented method of claim 7 further comprising using the degree of active copresence to determine whether to interrupt a primary interaction of the user with the individual.

12. The computer implemented method of claim 7 wherein the quality score of the plurality of primary interactions is based on a length of the plurality of primary interactions and the quality score of the plurality of secondary interactions is based on the length of the plurality of secondary interactions.

13. The computer implemented method of claim 12 wherein the degree of active copresence is based on a proportion of the length of the plurality of secondary interactions relative to the length of the plurality of primary interactions.

14. A computer implemented method of providing a degree of work life balance of a user, comprising:
- identifying a work group of a user, the work group comprising of one or more individuals associated with a workplace of the user;
- identifying a home group of the user, the home group comprising one or more individuals associated with a home of the user;
- identifying a work timeframe of the user and a home timeframe of the user;
- calculating a degree of home active copresence relative to the work group based on a length of the home timeframe and a length of time associated with interacting with the work group during the home timeframe;
- calculating a degree of work active copresence relative to the home group based on a length of the work timeframe and a length of time associated with interacting with the home group during the work timeframe;
- calculating a degree of work life balance based on the degree of home copresence and the degree of work copresence; and
- providing the degree of work life balance to the user.

15. The computer implemented method of claim 12 wherein the degree of work life balance is based on a proportion of the degree of work active copresence relative to the degree of home active copresence.

16. A computer implemented method of providing a user's degree of active copresence at work, comprising:
- identifying a work group of a user, the work group comprising of one or more individuals associated with a workplace of the user;
- identifying a work timeframe of the user;
- calculating a degree of work active copresence based on a length of the work timeframe and a length of time associated with interacting with one or more individuals not in the work group during the work timeframe;
- providing the degree of work active copresence to the user.

17. The computer implemented method of claim 16 wherein interacting with one or more individuals not in the work group comprises of corresponding via an email communication with one of the individuals not in the work group.

18. The computer implemented method of claim 16 wherein interacting with one or more individuals not in the work group comprises of corresponding via a phone call with one of the individuals not in the work group.

19. A computer implemented method for determining whether to interrupt a user engaged in a primary interaction, comprising:
- receiving a request for a secondary interaction with a secondary individual while a user is engaged in a primary interaction with a primary individual;
- determining an interaction acceptance value for the secondary individual;
- allowing the request for the secondary interaction if the interaction acceptance value satisfies an interrupt threshold.

20. The computer implemented method of claim 19 wherein the interaction acceptance value is based on a number of times the user accepted an interaction request from the secondary individual.

21. The computer implemented method of claim 19 further comprising determining a degree of active copresence for the primary individual.

22. The computer implemented method of claim 21 further comprising allowing the request for the secondary interaction if the degree of active copresence satisfies the interrupt threshold, otherwise ignoring the request for the secondary interaction.

23. The computer implemented method of claim 19 further comprising allowing the request for the secondary interaction if the interaction acceptance value satisfies the interrupt threshold, otherwise ignoring the request for the secondary interaction.

24. The computer implemented method of claim 23 wherein the secondary interaction comprises a phone call.

25. The computer implemented method of claim 24 wherein ignoring the request for the secondary interaction comprises causing the phone call to be forwarded directly to a voicemail service.

26. The computer implemented method of claim 24 wherein allowing the request for the secondary interaction comprises forwarding the phone call to a device of the user.

27. A system of providing a degree of active copresence of a user interacting with an individual, comprising:
- a memory to store a degree of active copresence;
- an interface operatively connected to the memory, the interface to communicate with a user; and
- a processor operatively connected to the memory and the interface, the processor for running instructions, wherein the processor identifies a primary interaction of the user, determines whether the user engages in the secondary interaction while engaged in the primary interaction, determines the degree of active copresence of the user during the primary interaction based on a quality score of the primary interaction and a quality score of the secondary interaction, wherein the degree of active copresence represents a level of engagement of the user during the primary interaction, and provides the degree of active copresence to the user via the interface.

28. The system of claim 27 wherein the secondary interaction comprises of an electronic communication.

29. The system of claim 27 wherein the secondary interaction comprises of a phone call.

30. The system of claim 27 wherein the quality score of the primary interaction is based on a length of the primary interaction and the quality score of the secondary interaction is based on the length of the secondary interaction.

31. The system of claim 30 wherein the degree of active copresence is based on a proportion of the length of the secondary interaction relative to the length of the primary interaction.

* * * * *